May 9, 1933.  S. E. RAWLS  1,908,555
MOWING MACHINE
Filed Sept. 11, 1931  4 Sheets-Sheet 4
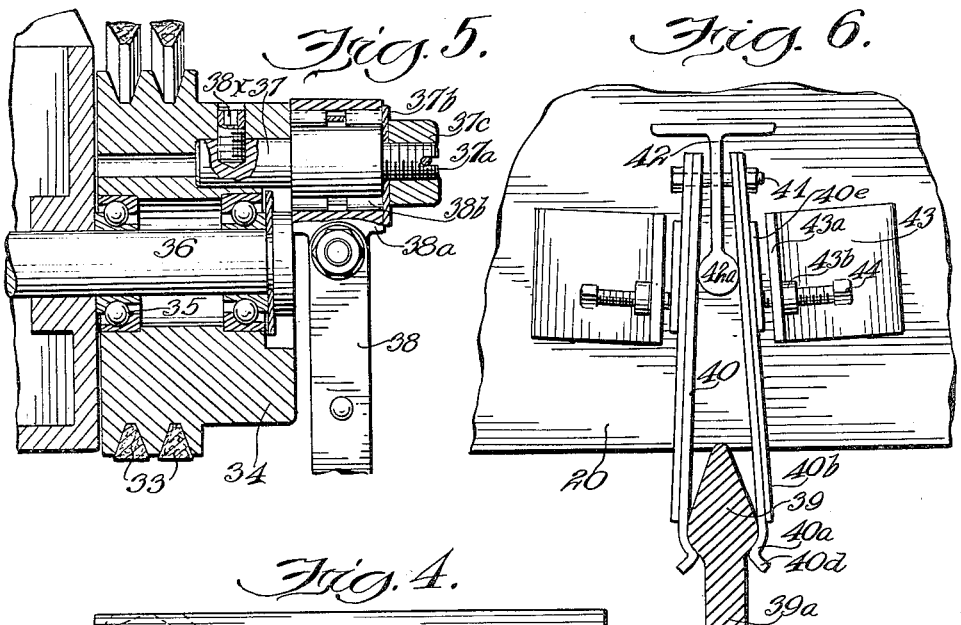
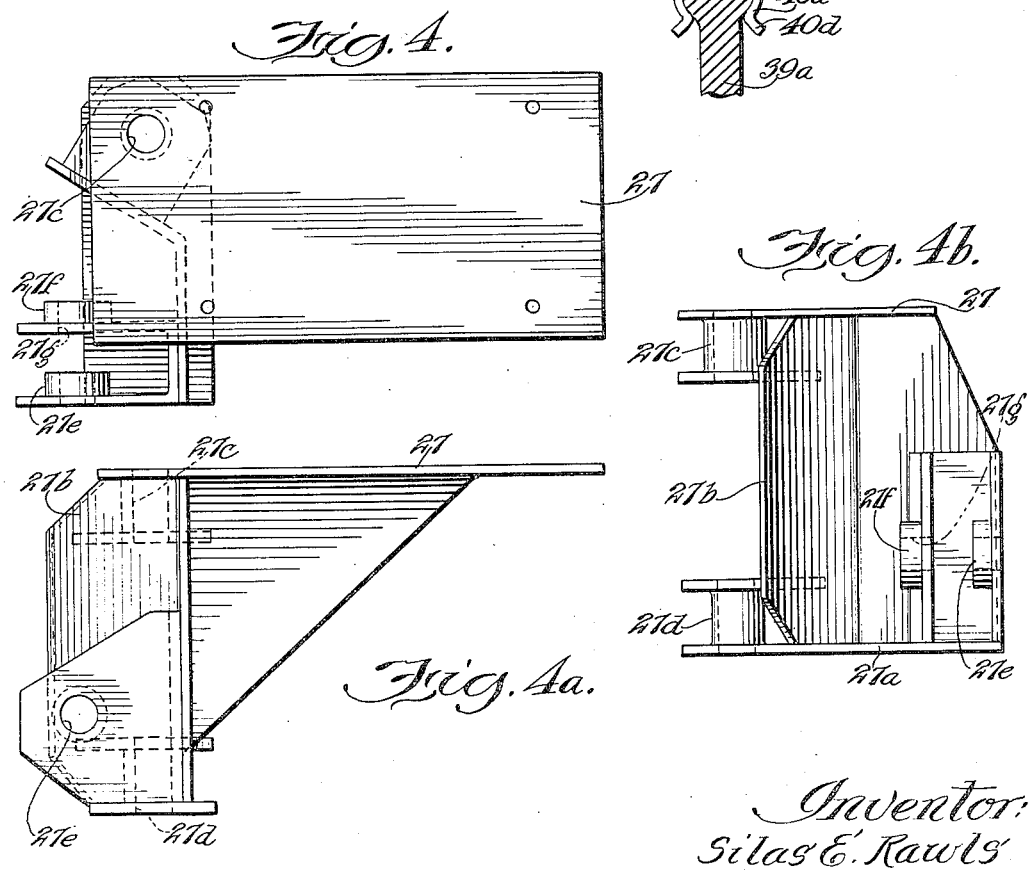
Inventor:
Silas E. Rawls
By Stevens + Batchelor
Attys.

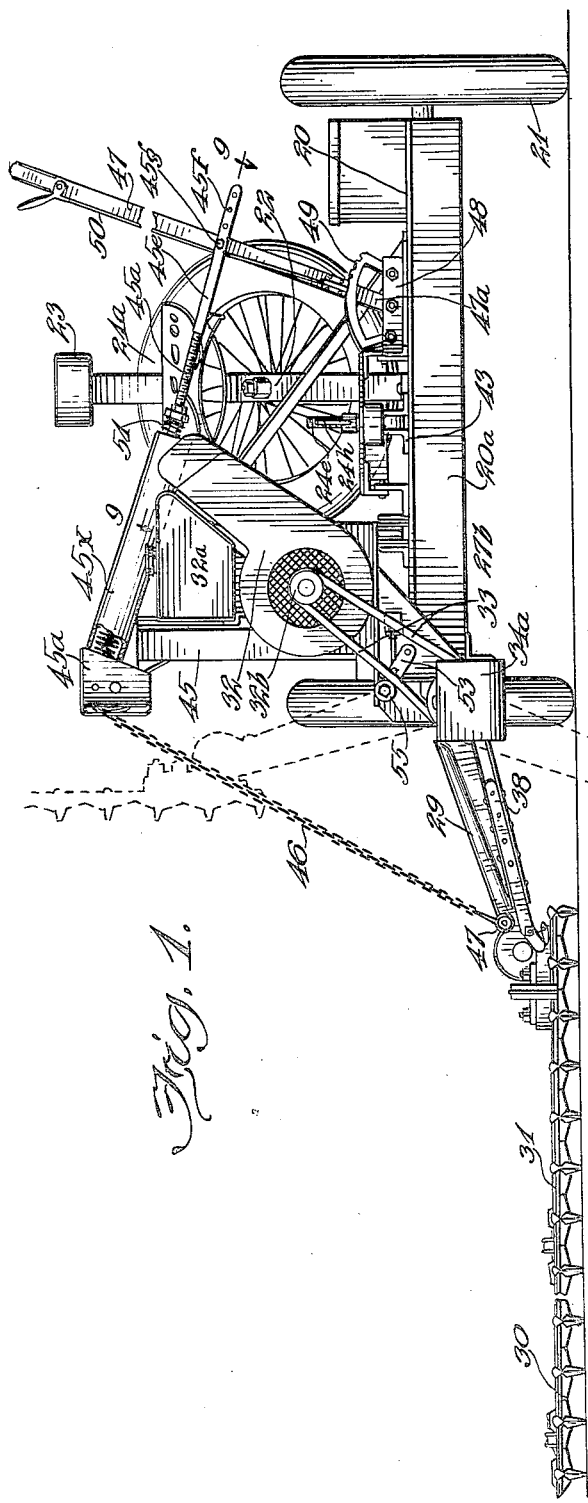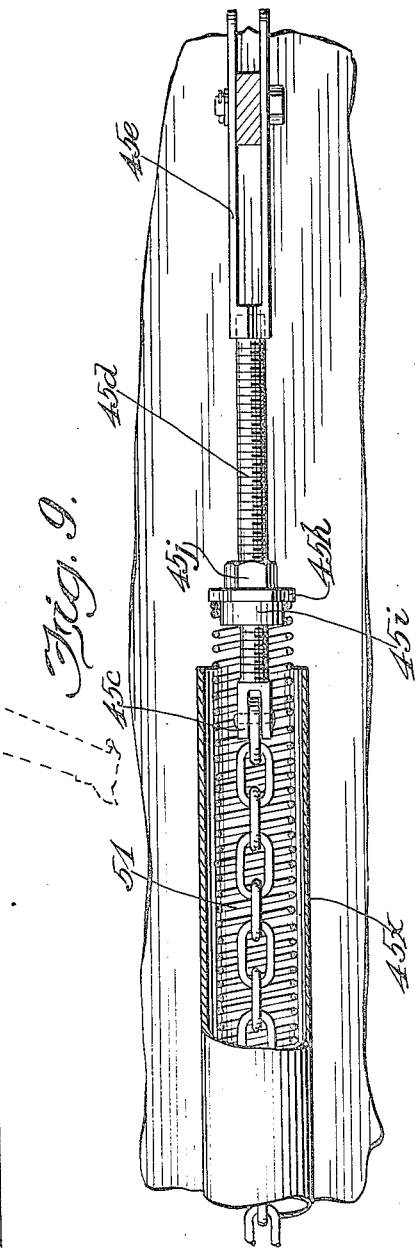

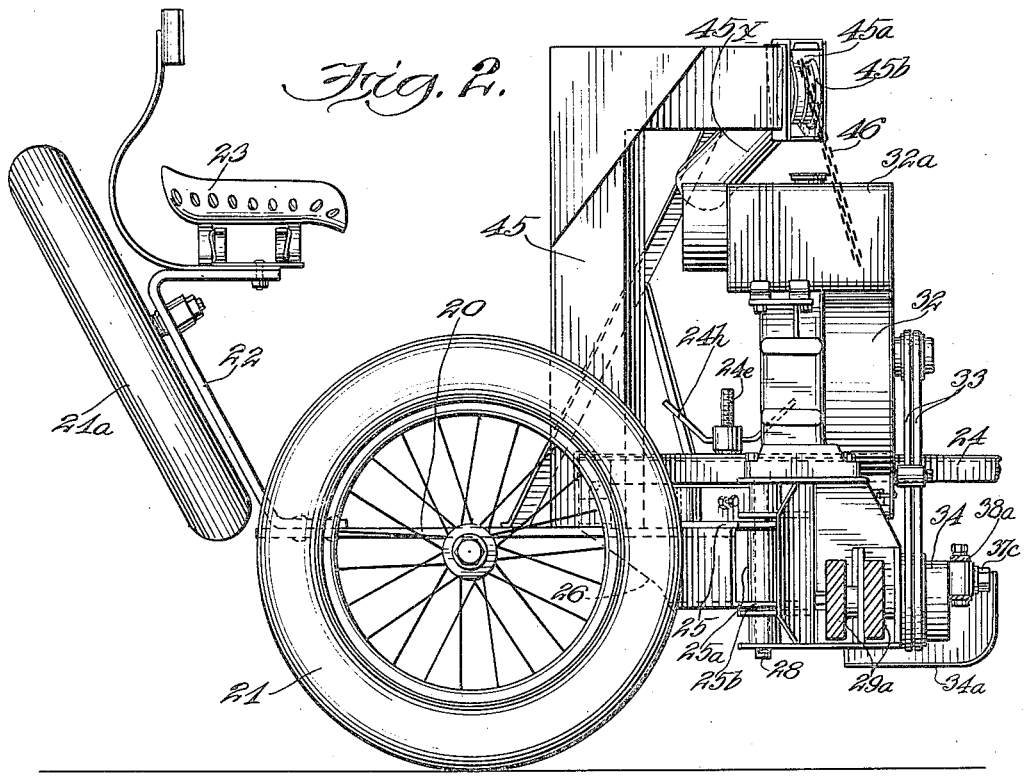
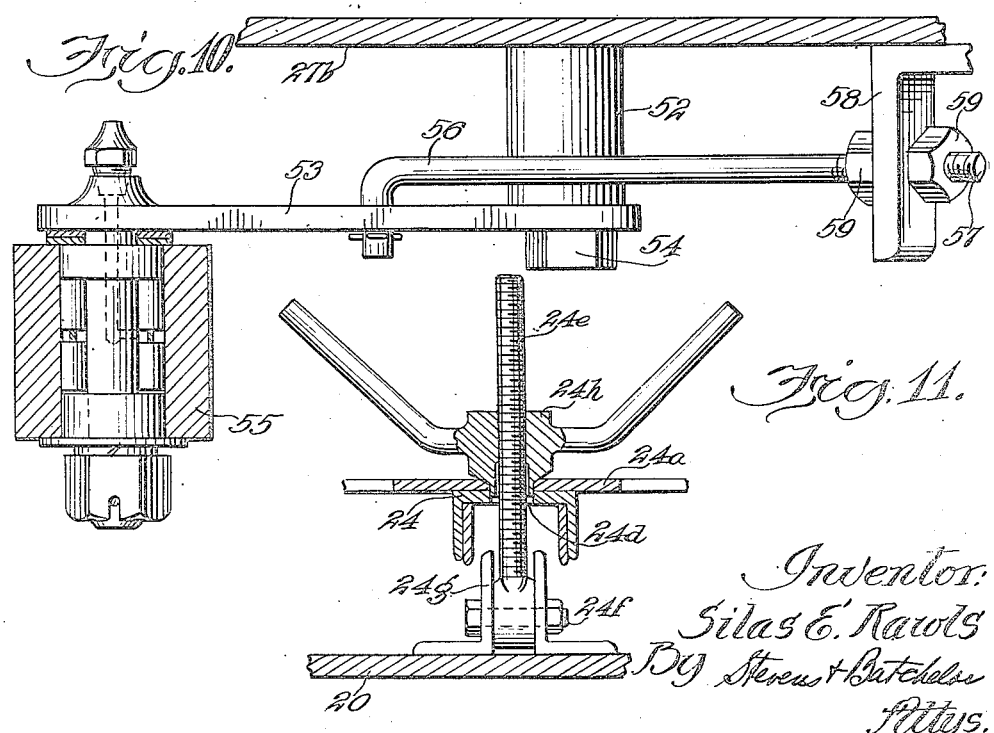

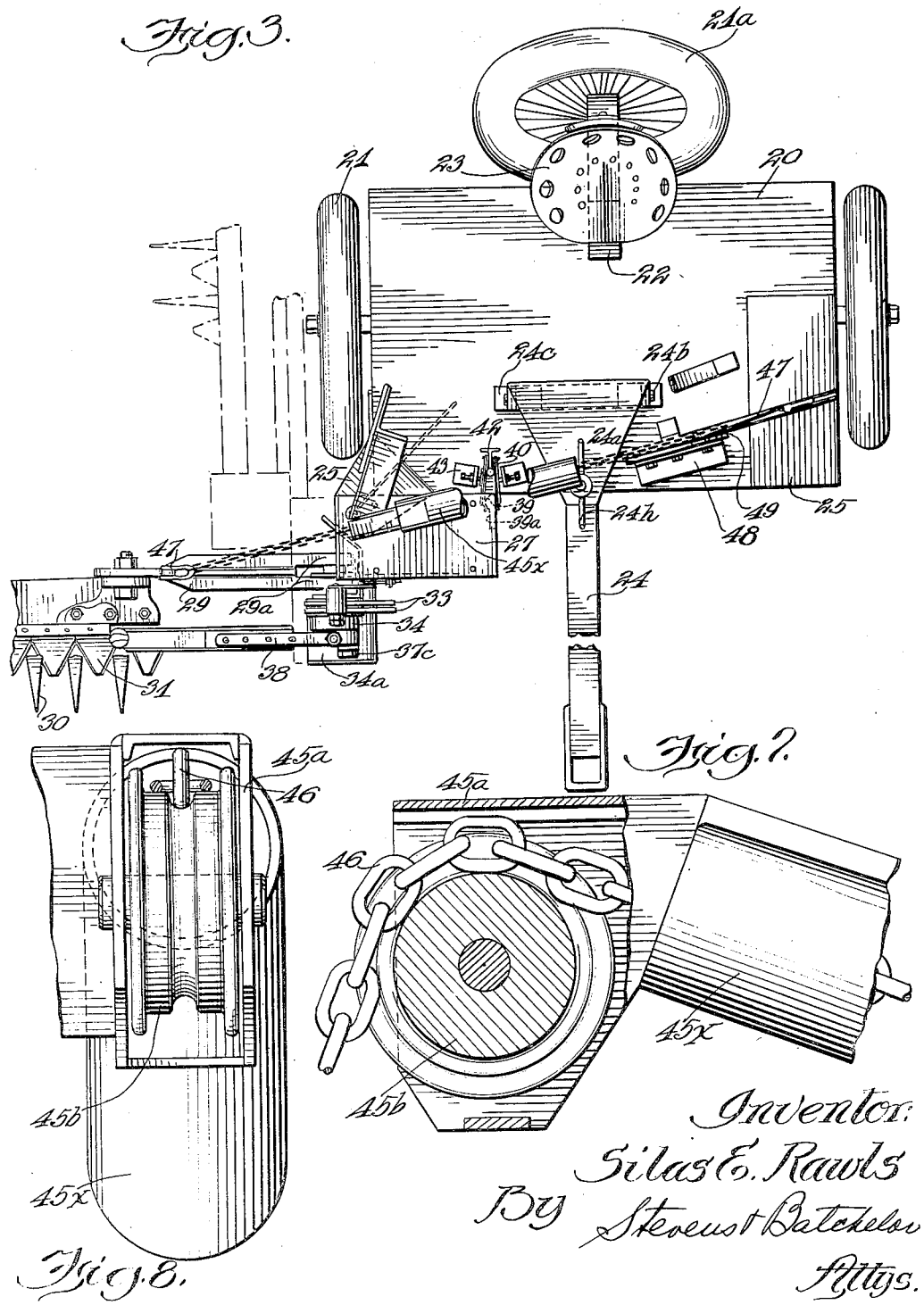

Patented May 9, 1933

1,908,555

UNITED STATES PATENT OFFICE

SILAS E. RAWLS, OF STREATOR, ILLINOIS

MOWING MACHINE

Application filed September 11, 1931. Serial No. 562,219.

My invention relates to mowing machines of the type employing a laterally projecting sickle-bar, and my main object is to provide a machine of this kind which is self-contained and operates at a high rate of efficiency.

A further object of the invention is to embody in the novel machine a unit composed of a power plant and mowing element, such unit being mounted pivotally relative to the machine.

A still further object of the invention is to employ a safety factor for the mowing element to avoid damage in case such element strikes an impediment or obstruction in the travel of the machine.

A still further object of the invention is to incorporate a direct V-belt drive between the power plant of the machine and the actuator of the mowing element.

Another object of the invention is to so dispose the mowing element that it may be adjusted to any level between a highly poised position and a low deflected position, depending upon the level of the course along which the mowing is to be done.

An additional object of the invention is to provide a novel counterbalance for the mowing element, in order that the operator may be relieved of the weight of the latter when adjusting the same to the desired level.

A significant object of the invention is to equip the novel mowing machine with a draw bar which is easily adjustable to be readily adaptable for towing or mounting in connection with a tractor, truck, touring car or other propelling unit.

A final object of the invention is to locate the outlet from the power plant in a position so exposed and accessible as to facilitate a convenient power drive for the mowing element and take-off from the power plant for miscellaneous power use.

With the above objects in view, and any others which may suggest themselves from the description to follow, a better understanding of the invention may be had by reference to the accompanying drawings, in which—

Figure 1 is a front elevation of the novel mowing machine;

Fig. 2 is a side elevation of the same minus a portion of the mowing element;

Fig. 3 is a plan view;

Fig. 4 is a plan view of a structural unit forming an important part of the machine;

Figs. 4a and 4b are elevations of the unit illustrated in Fig. 4, taken from the frontal and left-hand sides thereof, respectively;

Fig. 5 is a horizontal section of a crank drive seen in the lower left-hand portion of Fig. 3, and on a magnified scale;

Fig. 6 is a magnified plan view, partly in section, of a locking device seen in the center of Fig. 3;

Fig. 7 is a magnified fragmental view of a unit seen in the upper left hand corner of Fig. 1;

Fig. 8 is an end view of the said unit from the left-hand side of Fig. 7;

Fig. 9 is an enlarged section on the line 9—9 of Fig. 1;

Fig. 10 is a plan view of a bolt adjusting unit; and

Fig. 11 is a sectional enlargement of a draw bar adjusting device seen in the right-hand center of Fig. 1.

My mowing machine is designed primarily as a trailer, adapted to be drawn along the course of operation by any suitable vehicle or as a self-propelled mowing machine. It is therefore preferably built with a plate 20 for a base, such plate being reinforced by angle or other bars 20a on the under side and carrying traction wheels 21 at the sides. The plate receives a bracket 22 over its rear portion for the support of the operator's seat 23; and, as the wheels 21 are preferably rubber-tired for quiet and cushioned travel, I choose to attach a spare wheel 21a to the bracket 22 for use in case one of the regular wheels becomes disabled. The machine is intended to be propelled in a forward direction through the agency of a draw bar or tongue 24. For the sake of convenience I have shown a tool box 25 handily positioned upon the base plate 20.

As anticipated, I mount the power plant of the machine pivotally relative to the base plate 20, so that with the mowing element as a unit, the assembly may swing laterally in one or in the other direction relative to the machine. Accordingly, I extend the base plate 20 at one of its frontal corners with a support comprised of top and bottom gusset plates 25 and 25a built integrally with a uniting web 26. This structure is attached to the base plate 20 by welding or riveting the gusset plate 25 over the corner of the base plate, so that the two gusset plates are in vertical order and spaced relation. The structure just described thus forms a rigid and substantial twin-extension of the base plate, the twin sections being the extended portions of the gusset plates which are intended to form ears for the pivotal disposition of a support illustrated in Figs. 4, 4a and 4b.

Relative to the support just mentioned, reference to the figures mentioned will indicate that the support is composed of a top plate 27, a bottom plate 27a, a connecting web 27b, a top bearing 27c, a bottom bearing 27d and side bearings 27e and 27f.

It is seen in Fig. 2 that the support under consideration is so dimensioned that the bearings 27c and 27d receive between them the extended portions of the gusset plates 25 and 25a when the support is assembled with these, so that a king pin 28 may be passed through the alined parts to pivotally dispose the support relative to the base plate. The gusset plate extensions are preferably connected by a bearing 25b to supplement the bearings 27c and 27d.

The side bearing 27f is horizontally bored as indicated at 27g to receive the forked inner end 29a of the cutter bar 29, a suitable pin being applied to the connection to make the same pivotal relative to the support 27. The cutter bar is extended with a conventional type of sickle-bar 30 which contains a reciprocable blade 31.

Upon the support plate 27 is erected the power plant 32, which is preferably a gasoline engine having a self-cooling arrangement and a fuel tank 32a.

As seen in Fig. 3, the position of the plate 27 places the power plant well forward of the base plate 20, and makes the pulley 32b of the engine project in an exposed position for the application of a drive or a power take-off. For a drive, I prefer to use a double V-belt 33, which descends to receive a driven pulley 34 mounted by means of ball or other suitable bearings 35 upon a spindle 36 projecting from the bearing 27e, it being understood that the spindle has its inner end fast in the bearing. The pulley 34 carries a crank pin 37, fixed by a suitable set screw 38x and projecting forwardly to receive the head 38a of a pitman 38, the crank pin then being reduced as indicated at 37a and threaded to receive a washer 37b and a securing nut 37c. The head of the pitman is preferably made with roller bearings 38b to ease its operation. Also, the structure 27 is fitted with a bottom guard 34a, as easily seen in Fig. 2 to protect the assembly of the crank pin 37, pulley 34 and belt 33 from grass, weeds and other objects that may be encountered along the course of operation. As indicated in Fig. 1, the pitman 38 extends directly to the sickle blade 31 and induces the action thereof from the operation of the crank pin.

The normal position of the mowing element is in a directly lateral course from the machine, as clearly indicated in Figs. 1 and 3. However, it occasionally happens that an impediment or obstruction is met in the course of travel, and I have constructed the mowing element with a safety factor to yield to the obstruction and avoid strain or injury to the mechanism. Thus, the top plate 27 is extended downwardly at its inner rear corner with a pointed tongue 39 having a reduced shank 39a, as suggested in Fig. 2 and more clearly shown at the bottom of Fig. 6. When the mowing element is in normal position, this tongue is located between the jaws 40a of two laterally spaced springs 40 located over the frontal portion of the base plate 20. The springs 40 are reinforced externally as indicated at 40b, and further reinforced medially as indicated at 40c; and they receive a cross bolt 41 at the rear, such cross bolt passing through a standard 42 mounted on the base plate. The springs 40 straddle the standard and hug a frontal beaded portion 42a thereof, such portion being intended as a fulcrum for the lateral adjustment of the springs. On each side of the spring assembly the base plate receives angle plates 43 having upstanding sections 43a. The latter are made with bores 43b for the passage of set screws 44 in an internal direction to bear upon the reinforcing plates 40c of the springs 40. Thus the bolt 41 serves to connect the springs, while the screws 44 serve to contract or separate the same to exert the proper pressure upon the tongue 39. It follows, therefore, that in case the mowing element strikes an impediment or obstruction it may recede as indicated by dotted lines in Fig. 3, withdrawing the tongue from the lock formed by the springs 40, saving strain or damage. The springs are formed with flaring frontal ends 40d, which serve to permit the easy re-entrance of the tongue when the obstruction has been removed and the mowing element has been swung back into place.

The operation of a machine of the above type meets courses of different slopes; thus, at one time the course may be fairly level from the side of the machine, while at another time it may rise gradually or steeply from the same, and still at another time slope with a downward incline. It is therefore essential that means be provided to raise or lower the cutter bar 29 accordingly, as indicated by dotted lines in Fig. 1. For this purpose, I erect a superstructure 45 upon the base plate 20, mounting upon the latter a bearing 45a to house a pulley 45b over which a chain 46 is run. One portion of the chain extends downwardly to connect at 47 with the outer portion of the cutter bar 29; and the other portion thereof extends through a tubular housing 45x communicating with the bearing 45a to make a connection 45c with one end of a bolt 45d, the other end of this bolt being formed with a fork 45e to straddle a hand lever 47 located at the front of the machine. This lever is pivoted with its bottom at 47a in a suitable fixture 48 mounted on the base plate 20 and adapted to swing laterally in relation to a sector 49, a suitable control 50 being provided to fix the adjustment of the lever relative to the sector. Also, the fork 45e of the bolt 45d is formed with longitudinally spaced perforations 45f for the selected application of a connecting bolt 45g to secure the lever through the fork at the best position consistent with its adjustment relative to the sector 49.

It is evident that by swinging the lever 47 in one or the other direction, the raising or lowering of the cutter bar 29, and consequently the mowing element, may be accomplished. However, this element is quite heavy and will occasion a serious strain on the operator. I have therefore counterbalanced the element by a simple expedient. Referring more particularly to Figs. 1 and 9 it will be seen that a long coil spring 51 is disposed in the tubular extension 45b, the chain 46 running through this spring, as clearly shown in Fig. 9. The spring simply abuts the bearing 45a at the outer end but bears against the flange 45h of a nut 45i disposed on the bolt 45d. The spring is of such a gauge and expansive tendency that it bears against the nut 45i to a sufficient degree to counterbalance the weight of the mowing element. When this condition has once been ascertained and the nut properly adjusted, a lock nut 45j fixes the adjustment. It will be seen that the raising or lowering of the mowing element may now be accomplished with ease by the manipulation of the lever 47.

In dealing with belt drives, slack is encountered sooner or later, and I have devised a simple and efficient expediency to counteract this tendency. Referring particularly to Figs. 1 and 10 it will be noted that I have extended a stud 52 from the web 27b of the support 27, pivoting the inner end of a radius arm 53 to this stud by means of a bolt 54. The outer end of the radius arm carries an idler 55 which is in contact with the outer portion of the belt. Intermediately of the ends of the radius arms, the latter receives a rod 56 which extends in a remote direction from the arm and is formed into a screw 57 which passes through a bracket 58 carried by the web 27b, the screw receiving a nut 59 on each side of the bracket. It will be seen that the angle of the arm 53 may be varied by advancing or withdrawing the rod 56 while the nuts 59 are in a loose condition so that a requisite amount of pressure is imparted to the belt in order to remove its slack. The nuts 59 are then tightened against the bracket to fix the adjustment.

In attaching the novel machine behind a tractor, motor car or other vehicle, the height of the draw bar 24 may require adjustment. I have provided for this requirement as follows:—The draw bar is first mounted with a web plate 24a at the rear as indicated at 24 in Fig. 3, to form a broad pivotal connection 24b in a standard 24c secured on the base plate 20. The draw bar and plate are then perforated medially as indicated at 24d in Fig. 11, to allow the passage of a vertical bolt 24e, this bolt being pivoted at 24f in bottom angle standards 24g to permit the bolt 24e some lateral play due to the pivotal connection of the draw bar. Over the plate 24a, the bolt 24e receives a hand nut 24h, which may be adjusted to permit draw bar to assume a higher or lower position at the point of connection with the vehicle which draws the mowing machine.

It will be seen that the novel mowing machine is a structure of stability and ready adaptability for the purposes of its use. Thus, by being made with rubber tired wheels and carrying a separate wheel the comfort of the operator and the cushioning of the power plant are accomplished. Further, by building the power plant support and sickle drive bearing in one rigid piece or assembly, a fixed relation is established between the engine pulley and the sickle drive so as to require but a simple direct belt transmission which is in an exposed and easily accessible position, and requires a minimum of expense for construction and maintenance. The fact that I have built the unit of the power plant and mowing element in one assembly makes possible the simple power drive described, since no change in this drive is occasioned by the lateral or vertical adjustment of the mowing element because of the unitary mounting mentioned. Further a mounting of this kind is easily removable from the balance of the machine in case any portion of the mechanism suffers injury or gets out of order. In fact, its unitary design adapts the mounting for use on a tractor, truck or other traveling carrier. Further, the expedient for the lifting and lowering of the mowing element is one of extreme simplicity, since it is constructed of few parts and involves no unusual accuracy in its adjustment or effort for its manipulation. Further, the safety device for the mowing element in meeting impediments or obstructions is of simple construction and easily adjusted to the proper engaging or locking degree. Finally, the draw bar installation facilitates the quick adjustment of the draw bar to different heights at the point of connection with the leading vehicle.

I claim:—

1. A mowing machine comprising a carrier, a combined power plant and mowing device associated as a unit with the carrier, and means for swinging the unit laterally relative to the carrier.

2. A mowing machine comprising a carrier, a combined power plant and mowing device associated as a unit with the carrier, and a vertical pivot joining the unit to the carrier to render the unit laterally swingable relative to the carrier.

3. A mowing machine comprising a carrier, a support adjoining the same, means connecting the support for laterally swingable motion relative to the carrier, a power plant carried by the support, and a mowing device operated by the power plant and extending laterally of the support.

4. The structure of claim 3, an actuator for the mowing device between the power plant and the latter, and a direct drive between the power plant and the actuator.

5. The structure of claim 3, a frontal outlet pulley for the power plant, an actuator for the mowing device on the pulley, said actuator including a drive pulley, and a belt forming a direct motive connection between the pulleys.

6. A mowing machine comprising a carrier, a support adjoining the same, means connecting the support for laterally swingable motion relative to the carrier, a power plant carried by the support and a reciprocable mowing device operated by the power plant and extending laterally of the support.

7. A mowing machine comprising a carrier, a support adjoining the same, means connecting the support for laterally swingable motion relative to the carrier, a power plant carried by the support, a mowing device attached to the latter and including a reciprocable sickle, a crank element operated by the power plant, and a pitman connection between the crank element and the sickle to operate the latter.

8. A mowing machine comprising a carrier, a support adjoining the same, means connecting the support for laterally swingable motion relative to the carrier, a power plant carried by the support, a mowing device extended laterally from the support, and a pivotal connection between the mowing device and the support to permit the mowing device to be swung between high and low limits relative to the support.

9. A mowing machine comprising a carrier, an extension of the latter comprising perforated and vertically spaced ears, a power mowing unit adjoining the carrier, perforated extensions of the unit opposite the ears and in registration therewith, and a bolt passing through the ears and extensions to render the unit laterally swingable relative to the carrier.

10. A mowing machine comprising a carrier, a support adjoining the same, means connecting the support for laterally swingable motion relative to the carrier, a power plant mounted upon the support, a horizontal pivot bearing projecting laterally from the support, and a mowing device operated by the power plant and extending laterally from the support, the inner end of the mowing device connecting with the support by way of said pivot bearing to be swung between high and low levels relative to the support.

11. A mowing machine comprising a carrier, a support adjoining the same, means connecting the support for laterally swingable motion relative to the carrier, a power plant mounted upon the support, a mowing device extending laterally of the support and including a reciprocable sickle, a frontal bearing carried by the support, a frontal outlet pulley for the power plant, a driven pulley mounted on the bearing, a belt forming a direct motive connection between the pulleys, a crank element carried by the driven pulley, and a pitman connection between the crank element and the sickle to operate the latter.

12. The structure of claim 9, said mowing unit including a power plant, a crank element operated by the latter, a laterally-extended cutter bar, a reciprocable sickle operated by the crank element, and a rigid support; and the latter including said perforated extensions, a top plate as a base for the power plant, a side bearing as a support for the crank element, and a side bearing for the pivotal connection of the inner end of the cutter bar to the support to render the cutter bar swingable between high and low levels relative to the support.

13. A mowing machine comprising a carrier adapted for travel in a given course, a power mowing unit vertically pivoted to the carrier and including a laterally-extending mowing device, and a connection between the unit and the carrier to fix the unit against pivotal movement during the normal progress of the carrier, said connection being disengageable by the yielding of the mowing device to an impediment or obstruction in its path.

14. The structure of claim 13, said connection comprising a projection extended from the unit, and a yieldable keeper for the projection mounted on the carrier.

15. The structure of claim 13, said connection comprising a tongue extending from the unit, and spring jaws mounted on the carrier and receiving the tongue.

16. The structure of claim 13, said connection comprising a tongue extending from the unit, spring jaws mounted on the carrier and receiving the tongue, and means for adjusting the tension of the jaws to vary the pressure exerted by them upon the tongue.

17. The structure of claim 3, means at the inner end of the mowing device to connect it pivotally with the support whereby to be swingable between high and low levels relative to the support, and means attached to the mowing device and operable to lift and lower the same.

18. The structure of claim 3, means at the inner end of the mowing device to connect it pivotally with the support whereby to be swingable between high and low levels relative to the support, a super-structure erected on the carrier, guide means mounted in the superstructure, a chain attached to the mowing device and passing over the guide means for the lifting and lowering of the mowing device, and a counterbalance for the latter effective on the remote portion of the chain.

19. The structure of claim 3, means at the inner end of the mowing device to connect it pivotally with the support whereby to be swingable between high and low levels relative to the support, a super-structure erected on the carrier, guide means mounted in the superstructure, a chain attached to the mowing device and passing over the guide means for the lifting and lowering of the mowing device, a hand control connected to the remote portion of the chain, and an expansive spring between the superstructure and the hand control to counterbalance the mowing device.

20. The structure of claim 3, means at the inner end of the mowing device to connect it pivotally with the support whereby to be swingable between high and low levels relative to the support, a superstructure erected on the carrier, guide means mounted in the superstructure, a chain attached to the mowing device and passing over the guide means for the lifting and lowering of the mowing device, a hand control connected to the remote portion of the chain, an expansive spring between the superstructure and the hand control to counterbalance the mowing device, and means to adjust the tension of the expansion spring.

In testimony whereof I affix my signature.

SILAS E. RAWLS.